(12) United States Patent
Vaidya et al.

(10) Patent No.: US 11,277,832 B2
(45) Date of Patent: *Mar. 15, 2022

(54) DYNAMIC ALLOCATION OF RESOURCES TO SUPPORT SPLIT PROCESSING OF WIRELESS NETWORK COMMUNICATION LAYERS

(71) Applicant: Charter Communications Operating, LLC, St. Louis, MO (US)

(72) Inventors: Maulik V. Vaidya, Palmdale, CA (US); Curt C. Wong, Bellevue, WA (US); Pratik Das, Cenntennial, CO (US)

(73) Assignee: Charter Communications Operating, LLC, St. Louis, MO (US)

(*) Notice: Subject to any disclaimer, the term of this patent is extended or adjusted under 35 U.S.C. 154(b) by 0 days.

This patent is subject to a terminal disclaimer.

(21) Appl. No.: 16/789,915

(22) Filed: Feb. 13, 2020

(65) Prior Publication Data
US 2020/0187203 A1 Jun. 11, 2020

Related U.S. Application Data

(63) Continuation of application No. 15/717,143, filed on Sep. 27, 2017, now Pat. No. 10,616,879.

(51) Int. Cl.
*H04W 72/04* (2009.01)
*H04W 36/38* (2009.01)
(Continued)

(52) U.S. Cl.
CPC ....... *H04W 72/0433* (2013.01); *H04W 36/26* (2013.01); *H04W 36/38* (2013.01); *H04W 88/085* (2013.01); *H04W 80/08* (2013.01)

(58) Field of Classification Search
CPC . H04W 72/0433; H04W 80/08; H04W 36/38; H04W 36/26; H04W 36/0022;
(Continued)

(56) References Cited

U.S. PATENT DOCUMENTS

2005/0245267 A1* 11/2005 Guethaus ............... H04W 88/08
455/450
2007/0177552 A1* 8/2007 Wu ........................ H04W 88/08
370/335
(Continued)

FOREIGN PATENT DOCUMENTS

EP 2753143 B1 8/2017

*Primary Examiner* — Ricardo H Castaneyra
(74) *Attorney, Agent, or Firm* — Armis IP Law, LLC

(57) ABSTRACT

A network includes a first candidate pool of multiple upper-layer communication processing units and a second candidate pool of lower-layer communication processing units to support the split-layer processing. Initially, a first upper-layer processing unit and a first lower-layer processing unit in the network provide a first service over a wireless communication link established between a wireless access point and a communication device in a network. In response to receiving a request to support a second service, the network notifies the first upper-layer processing unit of the second service. If a combination of the first upper-layer processing unit and the first lower-layer processing unit cannot support the second service, the first upper-layer processing unit selects a second upper-layer processing unit. The selected second upper-layer processing unit selected from the first candidate pool is used in conjunction with the first lower-layer processing unit to support the second service.

34 Claims, 10 Drawing Sheets

(51) Int. Cl.
 *H04W 88/08* (2009.01)
 *H04W 36/26* (2009.01)
 *H04W 80/08* (2009.01)

(58) Field of Classification Search
 CPC ... H04W 88/085; H04W 40/02; H04W 24/02;
  H04W 92/20; H04W 48/18; H04W 76/15;
  H04W 88/08; H04W 76/10; H04W 76/19;
  H04W 8/24; H04W 92/12
 See application file for complete search history.

(56) References Cited

U.S. PATENT DOCUMENTS

| | | |
|---|---|---|
| 2015/0043435 A1 | 2/2015 | Blankenship et al. |
| 2015/0063373 A1 | 3/2015 | Savaglio et al. |
| 2015/0237571 A1 | 8/2015 | Laraqui et al. |
| 2016/0192181 A1* | 6/2016 | Choi .................. H04B 17/382 455/422.1 |
| 2017/0117996 A1* | 4/2017 | Lorca Hernando ... H04L 5/0073 |
| 2017/0367097 A1 | 12/2017 | Sohn et al. |
| 2018/0248787 A1 | 8/2018 | Rajagopal et al. |
| 2018/0287696 A1* | 10/2018 | Barbieri ................ H04W 36/22 |

* cited by examiner

| PROCESSING RESOURCE NAME | DISPOSED AT LOCATION | LOWER LAYER COMPANION OPTION(S) |
|---|---|---|
| CU1 | NODE 121 | DU1, DU2, DU3 |
| CU2 | TAP 125-1 | DU1, DU3 |
| CU3 | NODE 122 | DU1, DU2 |
| ... | ... | ... |

CONFIGURATION INFO. 375

FIG. 3

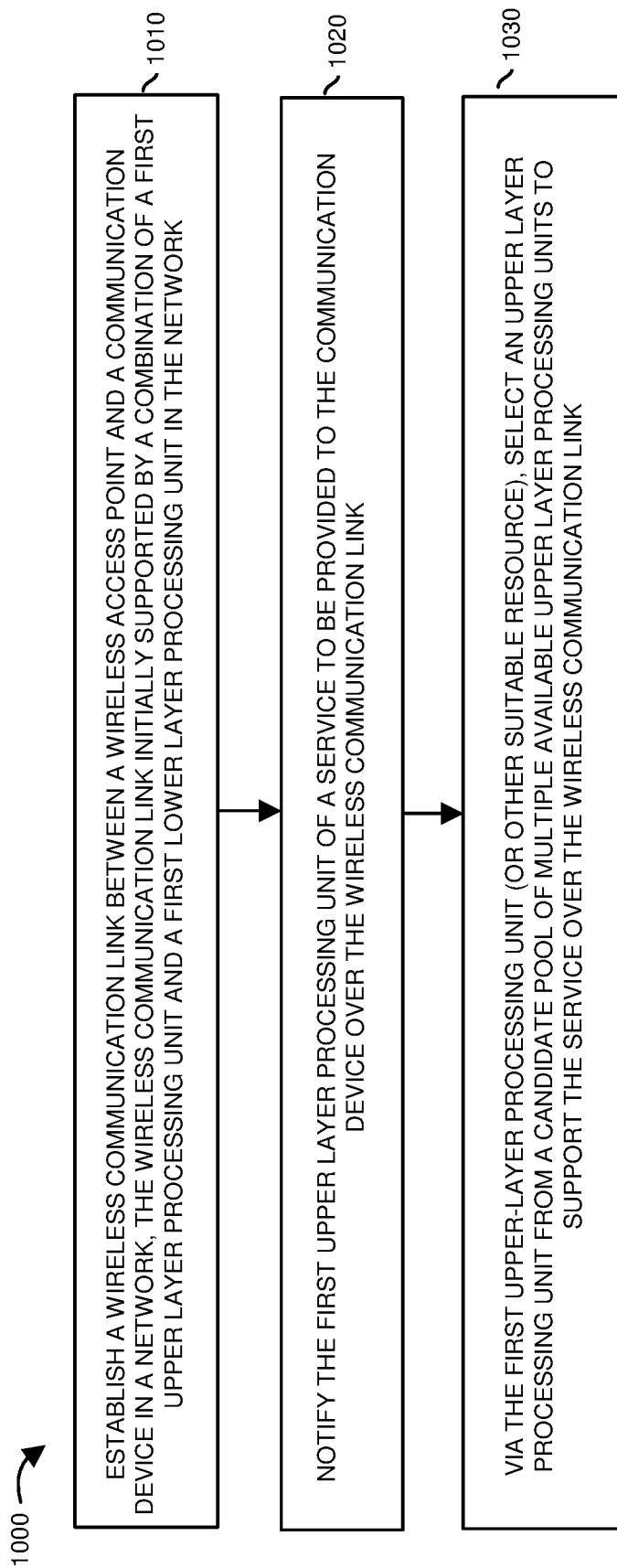

DYNAMIC ALLOCATION OF RESOURCES TO SUPPORT SPLIT PROCESSING OF WIRELESS NETWORK COMMUNICATION LAYERS

RELATED APPLICATION

This application is a continuation application of earlier filed U.S. patent application Ser. No. 15/717,143 entitled "REGISTRATION OF DEVICES FOR USE OF ONE OR MORE SERVICES," filed on Sep. 27, 2017, the entire teachings of which are incorporated herein by this reference.

BACKGROUND

Conventional LTE (Long Term Evolution) cellular networks typically include a core network, a RAN (Radio Access Network), and one or more mobile communication devices (user equipment). The radio access network resides between user equipment such as a mobile phone, a computer, or any remotely controlled machine and provides connection with its core network (CN). As its name suggests, the radio access network provides respective user equipment access (such as Internet access) via the core network.

Conveyances of wireless communications (data payloads) over a conventional LTE network require processing at many different network communication layers. For example, communication processing layers in a RAN architecture can include an RF (Radio Frequency) layer, a physical layer, a physical layer, a MAC (Multi-media Access Control) layer, a RLC (Radio Link Control) layer, a PDCP (Packet Data Converge Protocol) layer, an RRC (Radio Resource Control) layer, a data layer, etc.

A conventional wireless network can include multiple different types of resources to handle processing at the different communication layers. For example, first resources such as so-called CUs (Centralized Units) can be configured to support processing of upper-layers of wireless network communications such as at the PDCP layer, RRC layer, etc. Second resources such as so-called DUs (Distributed Units) can be configured to support processing of lower-layers of the wireless communications such as the RF layer, physical layer, MAC layer, etc.

The split of which layers the CUs and DUs support may vary depending on a respective implementation.

BRIEF DESCRIPTION OF EMBODIMENTS

There are deficiencies associated with conventional LTE cellular networks (e.g., 3G, 4G, 5G). For example, conventional cellular networks including CUs and DUs supporting split layer processing of wireless communications require that user equipment move from one location to another or require a change in availability of a CU or DU in order to be reallocated a new combination of upper-layer and/or lower-layer processing units to provide a higher quality communication service.

Embodiments herein provide novel ways of dynamically allocating upper and lower communication layer processing resources to support different wireless services in a network environment.

More specifically, in one embodiment, assume that a wireless network includes a first candidate pool of upper-layer communication processing units (such as CUs or Centralized Units) and a second candidate pool of lower-layer communication processing units (such as DUs) or Distributed Units) to support split-layer communication processing at different locations. The first candidate pool of multiple upper-layer communication processing units (each of which is potentially disposed at different geographical locations) can include a first upper-layer processing unit, a second upper-layer processing unit, a third upper-layer processing unit etc. The second pool of multiple lower-layer communication processing units (each of which is potentially disposed at different geographical locations) can include a first lower-layer processing unit, a second lower-layer processing unit, a third lower-layer processing unit, etc.

Each of the multiple upper-layer processing units supports processing of upper wireless communication layers; each of the multiple lower-layer processing units supports processing of lower wireless communication layers such as in an LTE (Long Terminal Evolution) network. In a similar manner as previously discussed, allocation of a combination of an upper-layer processing unit (from the first candidate pool) and a lower-layer processing unit (from the second candidate pool) provide appropriate processing of communications over the wireless communication link.

In certain instances, different combinations of an upper-layer processing unit and lower-layer processing unit support different services. A specific combination of an upper-layer processing unit and lower-layer processing unit may be required to provide a respective communication service to a requesting communication device. In one embodiment, selection of an upper-layer processing unit disposed close to a lower-layer processing unit provides a higher level of quality communication service to respective user equipment.

Initially, assume that a combination of a first upper-layer processing unit and a first lower-layer processing unit in the network support a first communication service over a wireless communication link established between a wireless access point and a communication device in a network. In such an instance, to support communications over the wireless communication link, for each conveyed communication, the first upper-layer processing unit performs communication processing at the upper-layers of the multiple network communication layers; the first lower-layer processing unit performs communication processing at the lower-layers of the multiple network communication layers.

Assume that the communication device (user equipment) generates a request to use a second wireless service (such as a high quality of service) instead of a currently used wireless service. In response to receiving the request to support the second communication service (such as a lower latency service) over the wireless communication link, the network (such as a management resource of the core network) notifies the currently allocated first upper-layer processing unit of the request for operation of the second service.

If it is determined that a currently allocated combination of the first upper-layer processing unit and the first lower-layer processing unit (previously used to provide the first wireless service) is able to support the second service as well, there is no need to select a new upper-layer processing unit or a new lower-layer processing unit. In such an instance, the first upper-layer processing unit and the first lower-layer processing unit are used to support the requested second communication service.

In one embodiment, the first upper-layer processing unit determines whether the combination of the original allocation of the first upper-layer processing unit and the first lower-layer processing unit is able to provide the second service. If so, the first upper-layer processing unit selects itself in lieu of another upper-layer processing unit (second upper-layer processing unit, third upper-layer processing unit, etc.) to support the second service over the wireless communication link.

Alternatively, if it is determined that the original allocation including the first upper-layer processing unit and the first lower-layer processing unit cannot support the requested second service, the first upper-layer processing unit (or other suitable resource) selects a second upper-layer processing unit (which becomes a replacement to itself) in furtherance of supporting the second communication service.

Thus, in one embodiment, the first upper-layer processing unit (or other suitable resource) is operable to select the second upper-layer processing unit to provide processing at the upper-layers if it is unable to support a desired service. If the new combination of the (newly selected) second upper-layer processing unit and the first lower-layer processing unit supports the requested second service, the selected second upper-layer-processing unit selected from the first candidate pool of upper-layer processing units is used in conjunction with the first lower-layer processing unit to support the second service over the wireless communication link.

In accordance with yet further embodiments, if it is further determined that the combination of the (newly selected) second upper-layer processing unit and the first lower-layer processing unit is unable to support the second service, the second upper-layer processing unit (or other suitable resource) can be configured to select a second lower-layer processing unit to be used instead of the first lower-layer processing unit to support the requested service. In such an instance, the communication device and wireless communication link can be handed off from the first lower-layer processing unit to the second lower-layer processing unit such that the new combination (of the second upper-layer processing unit and the second lower-layer processing unit) supports the requested second wireless service.

In accordance with further embodiments, selection of a replacement upper-layer processing unit can include: selecting an upper-layer processing unit (such as a second upper-layer processing unit) because it is physically closer to the first lower-layer processing unit than the first upper-layer processing unit. The nearness of the second upper-layer processing unit to the first lower-layer processing unit and use of such a combination of processing units reduces latencies associated with processing at the different layers. This, in turn, makes it possible to perform higher-level communication services.

As previously discussed, the upper-layer processing units process upper-layers associated with communications conveyed over the wireless communication link; the lower-layer processing units process lower-layers associated with the communications conveyed over the wireless communication link. Dynamic allocation of an upper-layer processing unit and/or lower-layer processing unit supports variations in quality of service.

In one embodiment, the split between the upper-layers and lower-layers occurs between the PDCP (Packet Data Convergence Protocol) layer and RLC (Radio Link Control) layer. For example, the PDCP (Packet Data Convergence Protocol) layer is included in the upper-layers and the RLC (Radio Link Control) layer is included in the lower-layers.

As previously discussed, dynamic allocation of upper-layer and/or lower-layer processing units in a network environment is useful over conventional techniques to provide different wireless services to respective user equipment.

These and other more specific additional embodiments are disclosed herein as further discussed below.

Note that any of the resources as discussed herein can include one or more computerized devices, mobile communication devices, servers, base stations, wireless communication equipment, communication management systems, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to facilitate control of a device. The instructions, when executed by computer processor hardware, cause the computer processor hardware (such as one or more co-located or disparately processor devices) to: establish a wireless communication link between a wireless access point and a communication device, the wireless communication link initially supported by a combination of a first upper-layer communication processing unit and a first lower-layer communication processing unit in the network; notify the first upper-layer communication processing unit of a requested service to be provided to the communication device over the wireless communication link; and at the upper-layer communication processing unit, select an upper-layer communication processing unit from a candidate pool of multiple available upper-layer processing units to support the requested service over the wireless communication link.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of supporting different wireless services. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention (s), the reader is directed to the Detailed Description section (which is a summary of embodiments) and corresponding figures of the present disclosure as further discussed below.

BRIEF DESCRIPTION OF THE DRAWINGS

FIG. 3 is an example diagram illustrating different companion upper and lower-layer processing options according to embodiments herein.

FIG. 10 is an example diagram illustrating a method according to embodiments herein.

Figure 1:
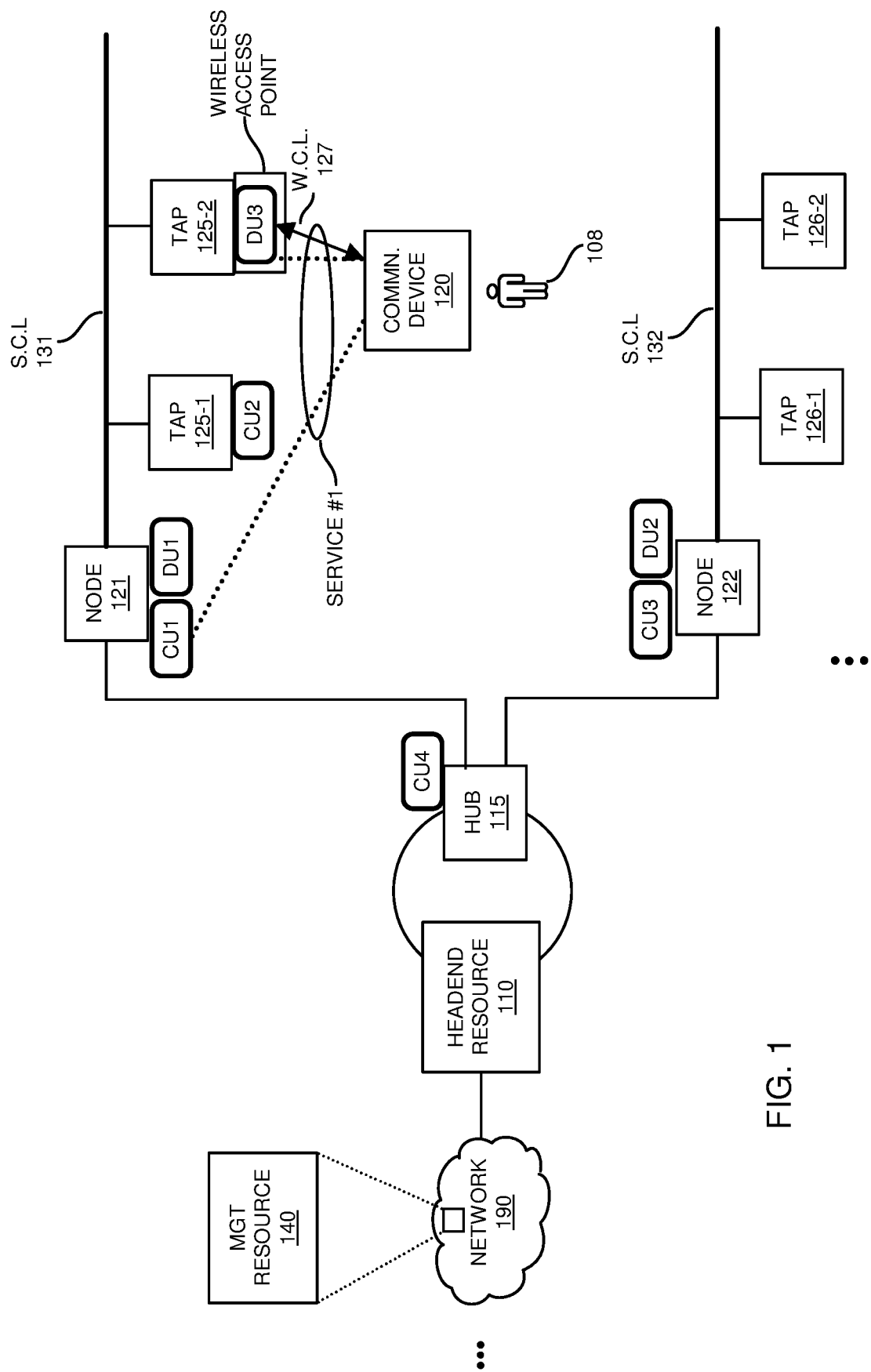
FIG. 1 is an example diagram illustrating split communication processing at multiple network communication layers amongst multiple resources to support communications over a wireless communication link according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

In accordance with general embodiments, a network includes a first candidate pool of multiple upper-layer communication processing units (CUs) and a second candidate pool of lower-layer communication processing units (DUs) to support split-layer processing. That is, each upper-layer processing unit processes the upper-layers of communications over the wireless communication link; each lower-layer processing unit processes lower-layers of communications over the wireless communication link.

Initially, assume that a first upper-layer processing unit and a first lower-layer processing unit in the network provide a first service over a wireless communication link established between a wireless access point and a communication device in a network. In response to receiving a request to support a second wireless service (higher Quality of Service), the network notifies the first upper-layer processing unit of the requested second service.

If a combination of the first upper-layer processing unit and the first lower-layer processing unit cannot support the second service, the first upper-layer processing unit selects a second upper-layer processing unit. The selected second upper-layer-processing unit selected from the first candidate pool is used in conjunction with the first lower-layer processing unit to support the second service.

As further described herein, if needed, the communication device and wireless communication link can be handed off from a first lower-layer processing unit to a second lower-layer processing unit if the combination of a currently selected upper-layer processing unit and a currently selected lower-layer processing unit are unable to support the second service.

Now, more specifically, FIG. 1 is an example diagram illustrating a network environment supporting different levels of quality of wireless service to one or more communication devices according to embodiments herein.

As shown, network environment 100 includes core network 190-1 (which includes or provides access to the Internet or other networks), head-end resource 110, hub 115, content distribution node 121, shared communication link 131, tap 125-1, tap 125-2, content distribution node 122, shared communication link 132, tap 126-1, tap 126-2, etc.

The network environment 100 can include any combination or number of resources (hubs, distribution nodes, shared communication links, taps, etc.) to provide data delivery access to one or more communication devices.

Note that network environment 100 can be any suitable type of network supporting wired and wireless communications. In one embodiment, the network environment 100 is a DOCSIS (Data Over Cable Service Interface Specification) network, which supports high-bandwidth data transfer to an existing cable TV (CATV) system. Such a network provides Internet access over existing hybrid fiber-coaxial (HFC) infrastructure.

In one embodiment, network environment 100 supports LTE communications (such as based on 3G, 4G, 5G, etc.).

In general, the components or resources in network environment 100 collectively provide each respective user (such as user 108 operating mobile communication device 120) wireless access to a remote network such as network 190.

In this example embodiment, to obtain network access, the user 108 operates the communication device 120 to establish a wireless communication link 127 with a respective wireless access point interface or base station at tap 125-2.

In one embodiment, the wireless communication link 127 supports LTE communications (such as based on 3G, 4G, 5G, etc.).

Via the wireless communication link 127, the communication device 120 is able to transmit upstream communications over the wireless communication link 127 to tap 125-2. Tap 125-1 forwards the upstream communications over shared communication link 131 (such as a coaxial cable, fiber, hard-wired link, etc.) to node 121. Node 121 forwards the upstream communications over a respective communication link to hub 115. Hub 115 forwards the upstream communications through the head end resource 110 to and through network 190 for delivery to a destination (network address) as specified by the communication device 120.

In a reverse direction, the network 190 forwards downstream communications (addressed to the communication device 120) through the head end resource 110 and hub 115 to node 121. Node 121 further forwards the respective downstream communications over the shared communication link 131 to tap 125-2. The base station at tap 125-2 forwards the communications over wireless communication link 127 to the communication device 120.

Accordingly, network environment 100 supports bi-directional communications between the communication device 120 and resources in network 190.

As further shown, and as previously discussed, network environment 100 includes multiple different types of resources to handle processing of communications at different communication layers. For example, first resources such as so-called CUs (Centralized Units or upper-layer communication processing units) are operable to support processing of upper-layers such as at the PDCP layer, RRC layer, etc., associated with wireless communications. Second resources such as DUs (Distributed Units or lower-layer communication processing units) are operable to support processing of lower-layers of the wireless communications such as the RF layer, physical layer, MAC layer, etc.

Note that each of the Centralized Units (or upper-layer processing units) can further include or support a further split of a respective CU-CP (Centralized Unit-Control Plane) and a CU-UP (Centralized Unit-User Plane).

In order to support various types of wireless services, such as eMBB (enhanced Mobile BroadBand), or URLLC (Ultra-Reliable and Low-Latency Communications), the needs of latency, jitter, bandwidth of the wired network transmitting F1, E1, and other interfaces will vary drastically. The CU and DU resources are disposed at various points in the network environment as previously discussed.

In one embodiment, the core management resource 140 decides, based on information such as location of a respective communication device, capabilities of the communication device, received wireless power signal levels from the communication device at the base stations, etc., whether and which CU-DU pair is initially assigned for use by the communication device.

Figure 2:
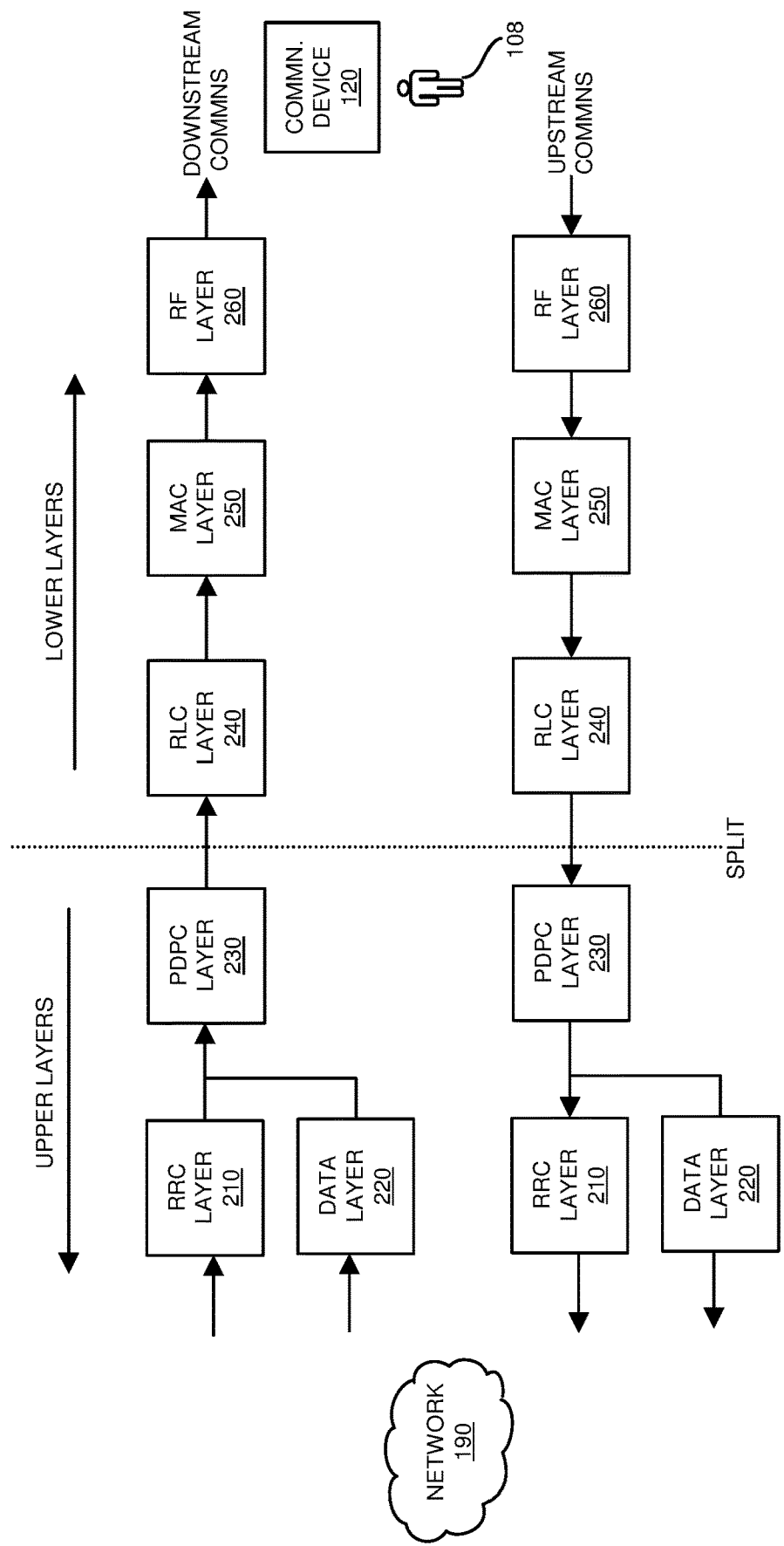
FIG. 2 is an example diagram illustrating network layers and corresponding splits according to embodiments herein.

As further shown in FIG. 2, the split of which layers the CUs and DUs support may vary depending on an implementation.

In one embodiment, the upper-layer communication processing units (CUs) process upper-layers associated with communications conveyed over the wireless communication link 127; the lower-layer communication processing units (DUs) process lower-layers associated with the communications conveyed over the wireless communication link 127. As further described herein, dynamic allocation of an upper-layer processing unit and/or lower-layer processing unit supports variations in quality of service.

In one embodiment, as shown, the split between the upper-layer processing (via an allocated CU) and lower-layer processing (via an allocated DUs) occurs between the PDCP (Packet Data Convergence Protocol) layer 230 and RLC (Radio Link Control) layer 240. For example, the PDCP (Packet Data Convergence Protocol) layer 230 is included in the upper-layers (as processed by the allocated CU) and the RLC (Radio Link Control) layer 240 is included in the lower-layers (as processed by the allocated DU).

In accordance with further embodiments, the split between upper and lower-layers can be adjusted up or down in the network layering order such as between the RRC layer 210 and the PDPC layer 230; between the RLC layer 240 and the MAC layer 250; and so on.

Referring again to FIG. 1, embodiments herein provide novel ways of dynamically allocating upper and/or lower communication layer processing resources to support different wireless services in a network environment.

As shown in network environment 100 of FIG. 1, a first pool of multiple candidate upper-layer communication processing units (each of which is potentially disposed at different geographical locations in network environment 100) can include a first upper-layer processing unit CU1, a second upper-layer processing unit CU2, a third upper-layer processing unit CU3, etc. A second pool of multiple candidate lower-layer communication processing units (each of which is potentially disposed at different geographical locations in network environment 100) can include a first lower-layer processing unit DU1, a second lower-layer processing unit DU2, a third lower-layer processing unit DU3, etc.

Embodiments herein include dynamically allocating a CU-DU pair to support processing associated with wireless communications to provide a communication device network 120 access in network environment 100.

As previously discussed, each of the multiple upper-layer processing units (CUs) supports processing of upper wireless communication layers; each of the multiple lower-layer processing units (DUs) supports processing of lower wireless communication layers such as in a 5G implementation of a LTE (Long Terminal Evolution) network.

Note further that each of the upper-layer processing units (CUs) includes both computer processor hardware and corresponding software (set of executable instructions) to perform any of the operations as discussed herein; each of the lower-layer processing units (DUs) includes both computer processor hardware and corresponding software (set of executable instructions) to perform any of the operations as discussed herein.

In a similar manner as previously discussed, allocation of a combination (such as a CU-DU pair) of an upper-layer processing unit (from the first candidate pool) and a lower-layer processing unit (from the second candidate pool) can be used to provide appropriate processing of communications over the wireless communication link.

In this example embodiment as shown in FIG. 1, the communication device 120 establishes a respective wireless communication link 127 with a base station at 125-2 to use a first wireless service such as service #1 (such as a PDU Session Establishment for an eMBBB DN). Assume that this is a low-level communication service that doesn't require tight latencies on either control or user plane. In this example, the lower-layer processing unit DU3 is allocated at tap 125-2 to support processing of the wireless communications associated with communication device 120. The upper-layer processing unit CU1 at node 121 is allocated to support upper-layer processing associated with the wireless communications. Accordingly, the combination of CU1/DU3 supports wireless service #1 on behalf of communication device 120.

Different combinations of upper-layer processing units and lower-layer processing units support different levels of services. In certain instances, an appropriate combination of an upper-layer processing unit and lower-layer processing unit is required to provide a respective communication service. In one embodiment, an upper-layer processing unit disposed close to a lower-layer processing unit provides a higher level of quality communication service to respective user equipment to provide tight latencies.

Thus, initially, a combination of a first allocated upper-layer processing unit CU1 and a first allocated lower-layer processing unit DU3 in the network environment 100 support a first communication service (service #1) over a wireless communication link 127 established between a wireless access point and a communication device 120. In such an instance, to support communications over the wireless communication link 127, for each conveyed communication, the first allocated upper-layer processing unit CU1 performs communication processing at the upper-layers of the multiple network communication layers; the first allocated lower-layer processing unit DU3 performs communication processing at the lower-layers of the multiple network communication layers.

FIG. 3 is an example diagram illustrating different companion upper and lower-layer processing options according to embodiments herein.

As shown, configuration information 375 indicates different available processing resources and corresponding locations in which they reside. More specifically, configuration information 375 indicates that upper-layer processing unit CU1 can be allocated to provide upper-layer processing for base stations implementing lower-layer processing DU1 at node 121, DU2 at node 122, and DU3 at tap 125-2; upper-layer processing unit CU2 can be allocated to provide upper-layer processing for base stations implementing lower-layer processing DU1 at node 121, and DU3 at tap 125-2; upper-layer processing unit CU3 can be allocated to provide upper-layer processing for base stations implementing lower-layer processing DU1 at node 121 and DU2 at node 122. Configuration information can include further information indicating the different level of communications service supported by the different selectable DU/CU pairings.

Figure 4:
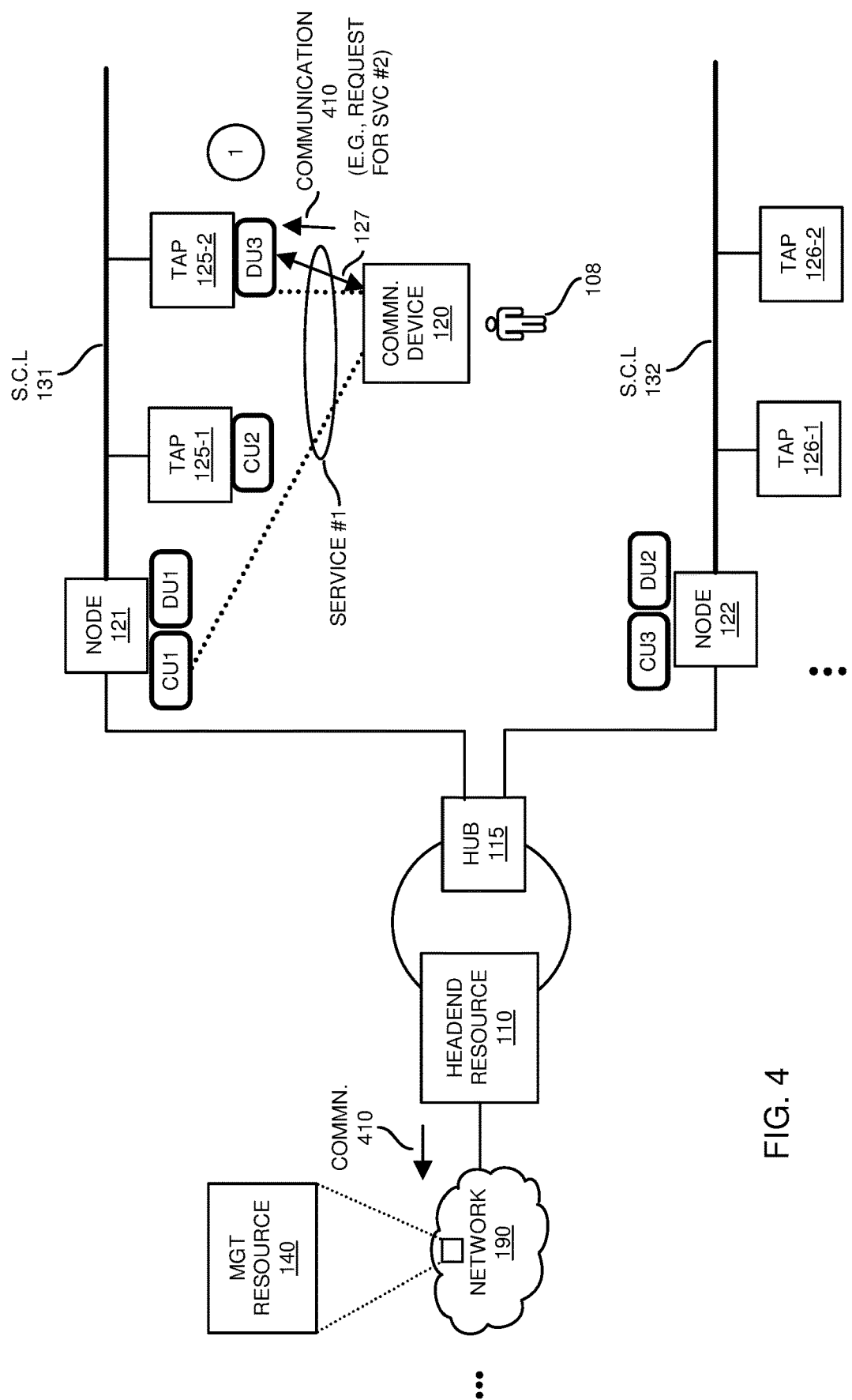
FIG. 4 is an example diagram illustrating communications associated with a request for use of an upgraded wireless communication service (session) according to embodiments herein.

FIG. 4 is an example diagram illustrating communications associated with a request for use of an upgraded wireless communication service according to embodiments herein.

In this example embodiment, assume that the communication device 120 (user equipment) generates and transmits a request (via communication 410) to use a second wireless service (such a service #2) instead of original service #1. For example, after using communication device 120-1 to communicate over the wireless communication link 127, assume that the communication device 120-1 requests a PDU Session Establishment for an URLLC DN. Such services (a.k.a., service #2) require extremely tight latencies on both user- and control-plane. Embodiments herein include a technique of potentially selecting a newly allocated CU that is closer to a currently allocated DU.

In one embodiment, the communication device 120 transmits the communication 410 over the wireless communication link 127 to tap 125-2; 125-2 forwards the communication 410 over the shared communication link 131 to node 121; node 121 further forwards the communication 410 through hub 115 and headend resource 110 to the manager resource 140. The manager resource 140 then determines whether or not the communication device 120 and corresponding user 108 are entitled to use of the service #2.

Figure 5:
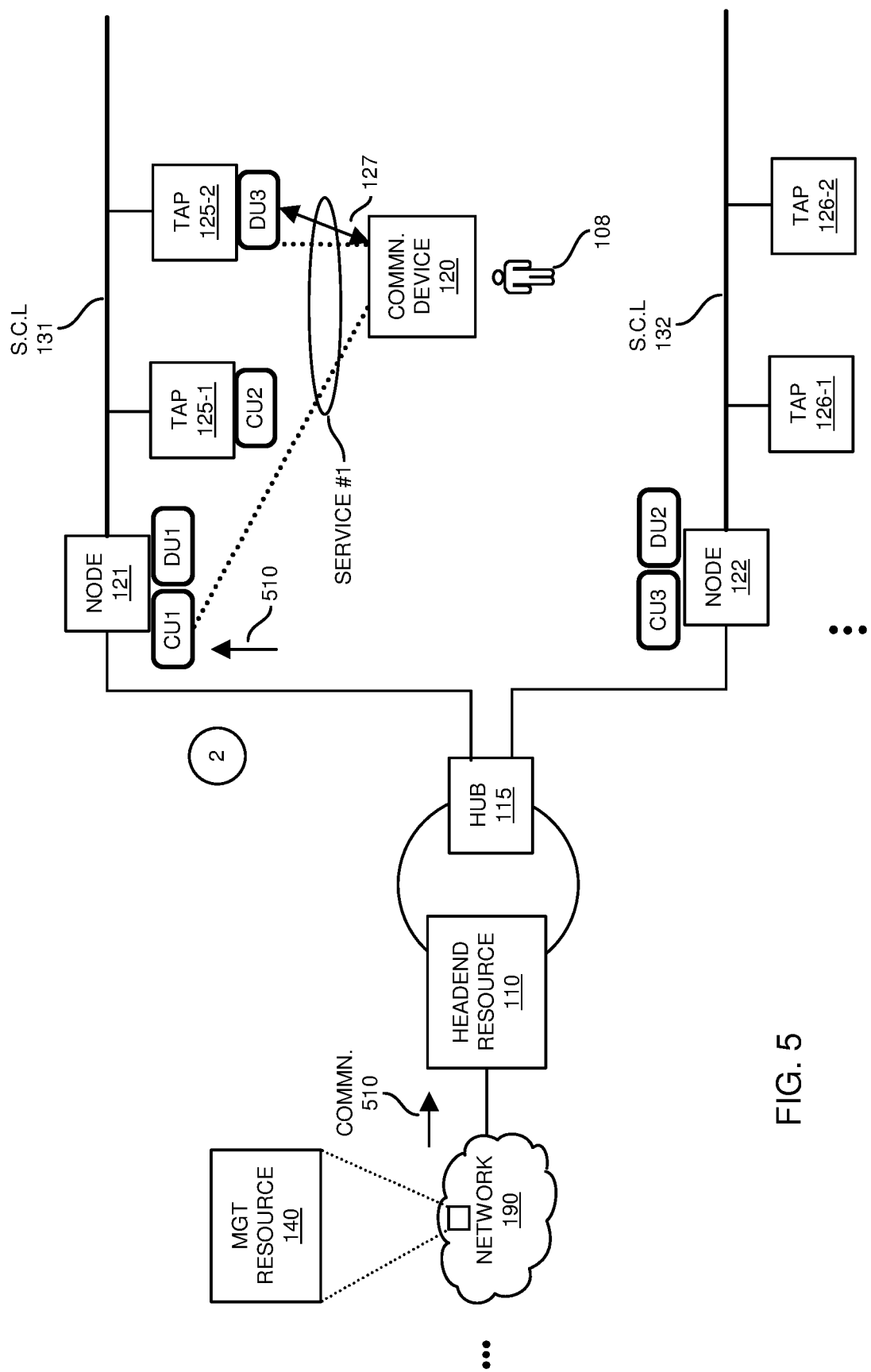
FIG. 5 is an example diagram illustrating response communications associated with a request for use of an upgraded wireless communication service according to embodiments herein.

FIG. 5 is an example diagram illustrating response communications associated with a request for use of an upgraded wireless communication session according to embodiments herein.

In response to receiving the communication 410 (such as generated by the manager resource 140) indicating a request to use the second communication service (which provides a lower latency of communication processing than the first service), the manager resource 140 of the core network 190 notifies the currently allocated first upper-layer processing unit CU1 of the request for use of the second service. Notification can include transmitting communication 510 from the management resource 140 to the upper-layer processing unit CU1.

In one embodiment, the communication 510 from management resource 140 (such as carried over N1-AP) includes a command that notifies and forces the CU1 to perform a selection of itself or another CU or DU or both to support the requested service #2. Accordingly, embodiments herein include communicating a command from the management resource 140 (such as core network) to the upper-layer processing unit CU1; the command in communication 510 notifies the first upper-layer processing unit to select an upper-layer processing unit to provide the service.

In accordance with further embodiments, the communication 510 can include one or more parameters (service parameters) indicating attributes such as a level of quality of wireless service associated with service #2 to be provided to the communication device 120. Accordingly, via communication 510, the first allocated upper-layer processing unit CU1 is notified that the communication device 120 is to be provided with wireless service #2 instead of current wireless service #1.

Figure 6:
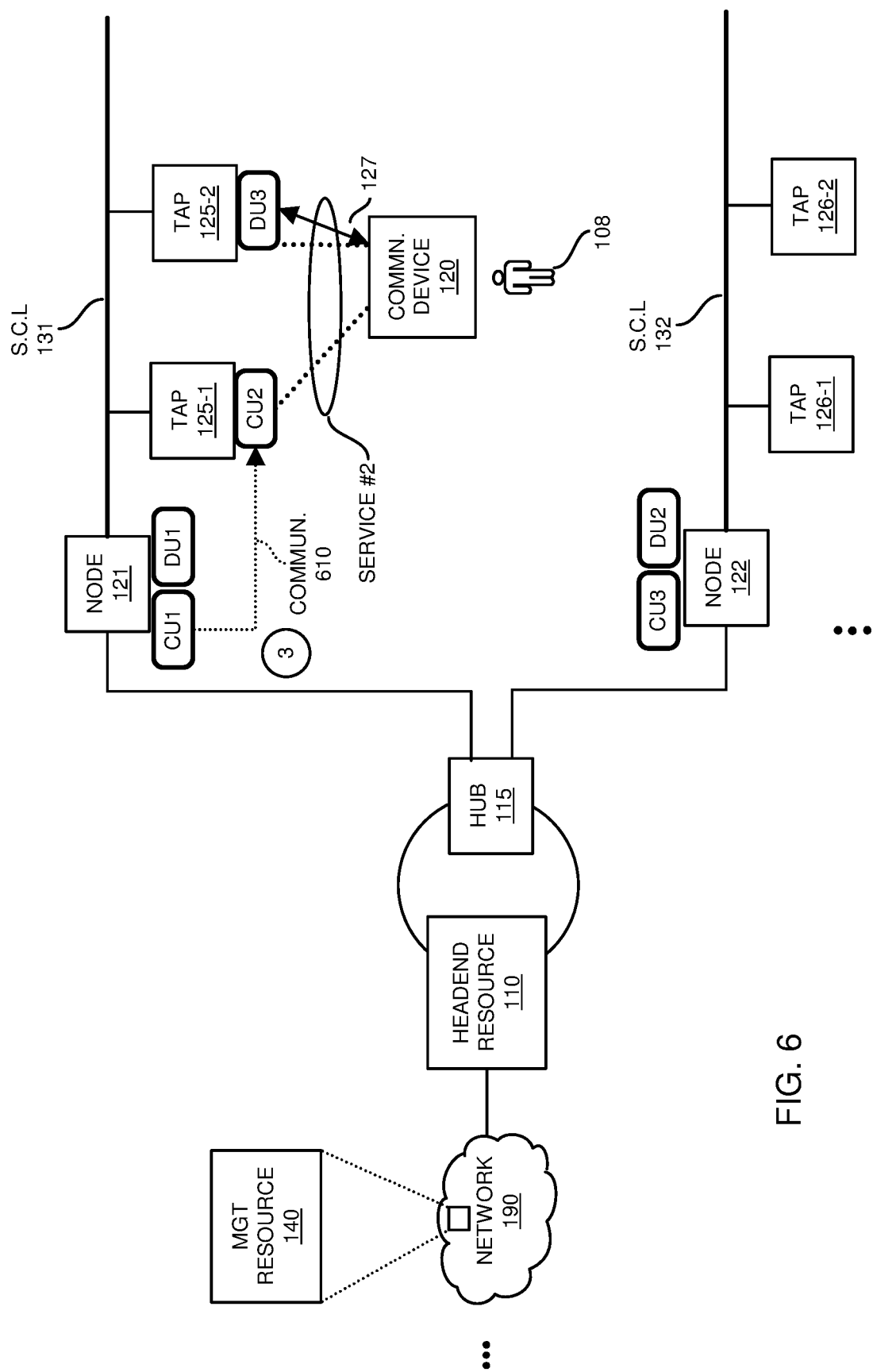
FIG. 6 is an example diagram illustrating a transfer of upper-layer processing from a first upper-layer processing unit to a second upper-layer processing unit according to embodiments herein.

FIG. 6 is an example diagram illustrating a transfer of upper-layer processing from a first upper-layer processing unit CU1 to a second upper-layer processing unit CU2 according to embodiments herein.

In response to receiving the communication 510 (indicating parameters of a service #2 to be provided to the communication device 120 over the wireless communication link 127), the initially allocated upper-layer processing unit CU1 determines whether the combination of currently allocated upper-layer processing unit CU1 and lower-layer processing unit DU 3 have the ability to provide service #2 over the wireless communication link 127 to the communication device 120.

In one embodiment, the upper-layer processing unit CU1 (or other suitable resource) determines that a combination of the currently allocated upper-layer processing unit CU1 and lower-layer processing unit DU3 is able to support the requested second service. In such an instance, there is no need to select a new upper-layer processing unit or a new lower-layer processing unit. In this instance, the upper-layer processing unit CU1 selects itself in lieu of another upper-layer processing unit to process the wireless communications. The currently allocated upper-layer processing unit CU1 and the lower-layer processing unit DU3 are then used to support the second communication service (service #2).

Alternatively, if it is determined by the CU1 or other suitable resource that the combination of the currently allocated upper-layer processing unit CU1 and the lower-layer processing unit DU3 cannot support the second service (requested service #2), the currently allocated upper-layer processing unit CU1 (or other suitable resource) selects upper-layer processing unit CU2 (which becomes a replacement to itself) in furtherance of supporting the second communication service.

Thus, in one embodiment, the upper-layer processing unit CU1 is operable to select the upper-layer processing unit CU2 to provide processing at the upper-layers if CU1 is unable to support a desired service.

Subsequent to selecting the upper-layer processing unit CU2 to process wireless communications at the upper communication layers, the upper-layer processing unit CU1 (or other suitable resource) sends a notification (via communication 610) to the upper-layer processing unit CU2 to initiate a transfer of processing.

The communication 610 can include any suitable information. For example, in one embodiment, the communication 610 indicates that the upper-layer processing unit CU2 has been selected to support processing of the upper-layers of communications associated with the wireless communication link 127 in lieu of the currently allocated upper-layer processing unit CU1.

Additionally, in one non-limiting example embodiment, the communication 610 further can be generated to indicate that lower-layer processing unit DU3 is currently allocated to process the lower level layers associated with communications over the wireless communication link 127.

In accordance with yet further embodiments, the communication 610 can include additional criteria such as appropriate parameters or information indicating that the second requested service is to be provided to the communication device 120.

In accordance with still further embodiments, the communications 610 can include state information associated with the wireless communication link 127 that facilitates a switchover to use of upper-layer processing unit CU2 instead of upper-layer processing unit CU1.

As previously discussed, the upper-layer processing unit CU2 receives notification that the lower-layer processing unit DU3 is currently selected to support processing at the lower-layers. The upper-layer processing unit CU2 (or other suitable resource) receiving the communications 610 can be configured to evaluate whether the combination of CU2 and DU3 is able to support the requested service #2 (higher level of quality service).

If this new combination of the (newly selected) upper-layer processing unit CU2 and the lower-layer processing unit DU3 supports the requested second service, the upper-layer-processing unit CU2 (selected from a candidate pool of upper-layer processing units) is used in conjunction with the lower-layer processing unit DU3 to support the second service over the wireless communication link 127.

In accordance with further embodiments, note that selection of the replacement of upper-layer processing unit CU1 with selection of CU2 can include: selecting an upper-layer processing unit CU2 based on criteria such as that the selected upper-layer processing unit CU2 is physically closer in proximity to the currently allocated lower-layer processing unit DU3 than the first allocated upper-layer processing unit CU1. In other words, CU2 is closer to DU3 than CU2. In one embodiment, the nearness of the upper-layer processing unit CU2 to the currently allocated lower-layer processing unit DU3 and use of such a combination (CU2/DU3) of processing units reduces latencies associated with processing of the communications associated with wireless communication link 127 at the different layers. This, in turn, makes it possible to provide higher-level communication services such as service #2 to communication device 120 over wireless communication link 127.

Figure 7:
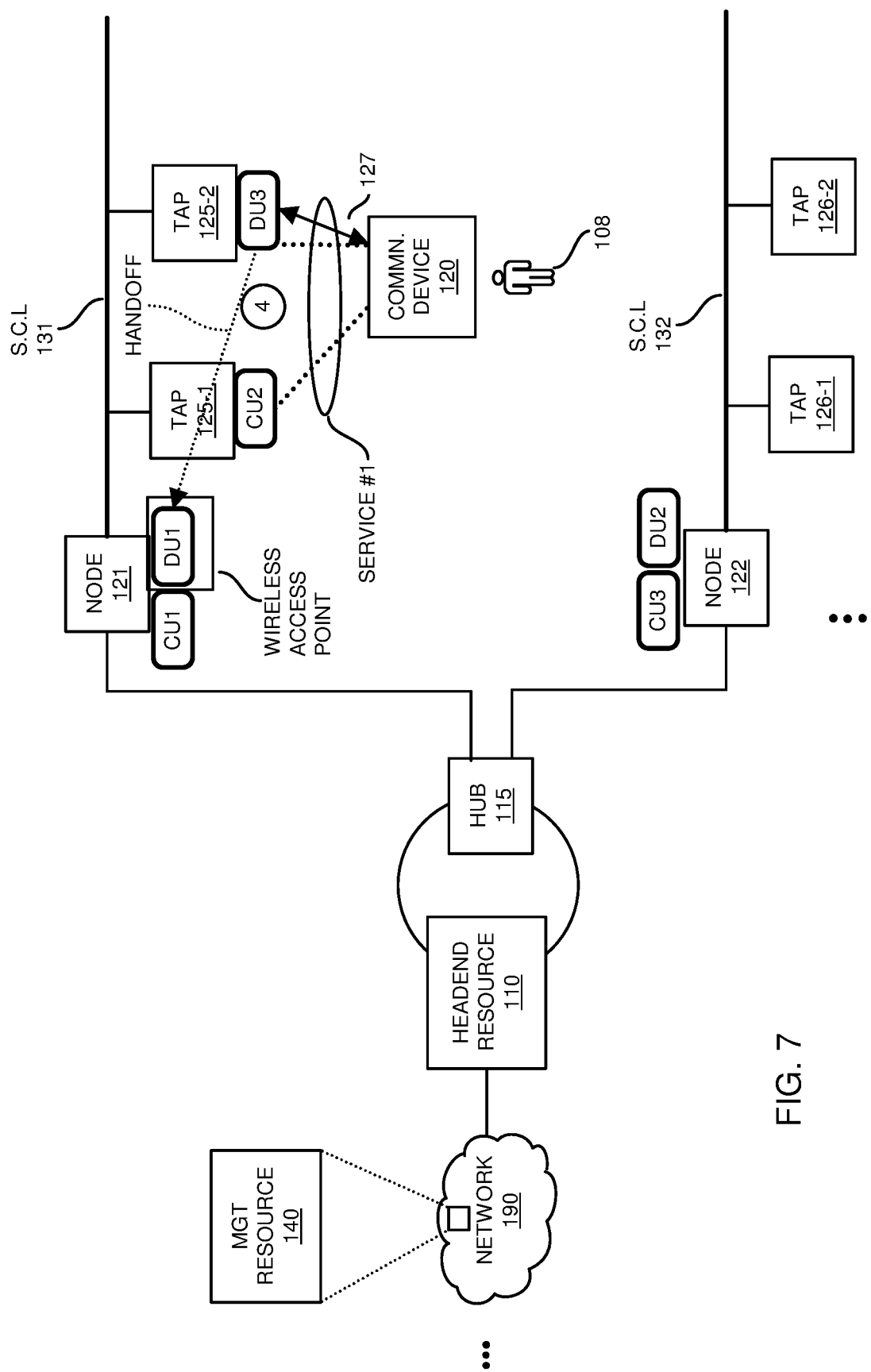
FIG. 7 is an example diagram illustrating communications initiating a transfer of lower-layer processing from a first lower-layer processing unit to a second lower-layer processing unit according to embodiments herein.

Alternatively, note that if this new combination of the (newly selected) upper-layer processing unit CU2 and the lower-layer processing unit DU3 does not support the requested second higher level of quality service, the upper-layer-processing unit CU2 (selected from the candidate pool of upper-layer processing units) performs operations to select a corresponding lower-layer processing unit that is able to support the second service as shown in FIG. 7.

FIG. 7 is an example diagram illustrating communications initiating a transfer of lower-layer processing from a first lower-layer processing unit to a second lower-layer processing unit according to embodiments herein.

In response to detecting that the combination of the upper-layer processing unit CU2 and the lower-layer processing unit DU3 do not have the ability to support the requested service #2 over the wireless communication link 127, the upper-layer processing unit CU2 (or other suitable resource) selects a new lower-layer processing unit to perform processing at the lower-layers in lieu of the currently allocated lower-layer processing unit DU3.

Assume in this example that the upper-layer processing unit CU2 detects that the combination of upper-layer processing unit CU2 and lower-layer processing unit DU1 do not have the ability to support the requested second service. CU2 selects DU1 to handle processing of lower communication layers. In such an instance, the upper-layer processing unit CU2 or other suitable resource initiates a handoff of the wireless communication link 127 from DU3 to DU1, results of which are shown in FIG. 8.

Figure 8:
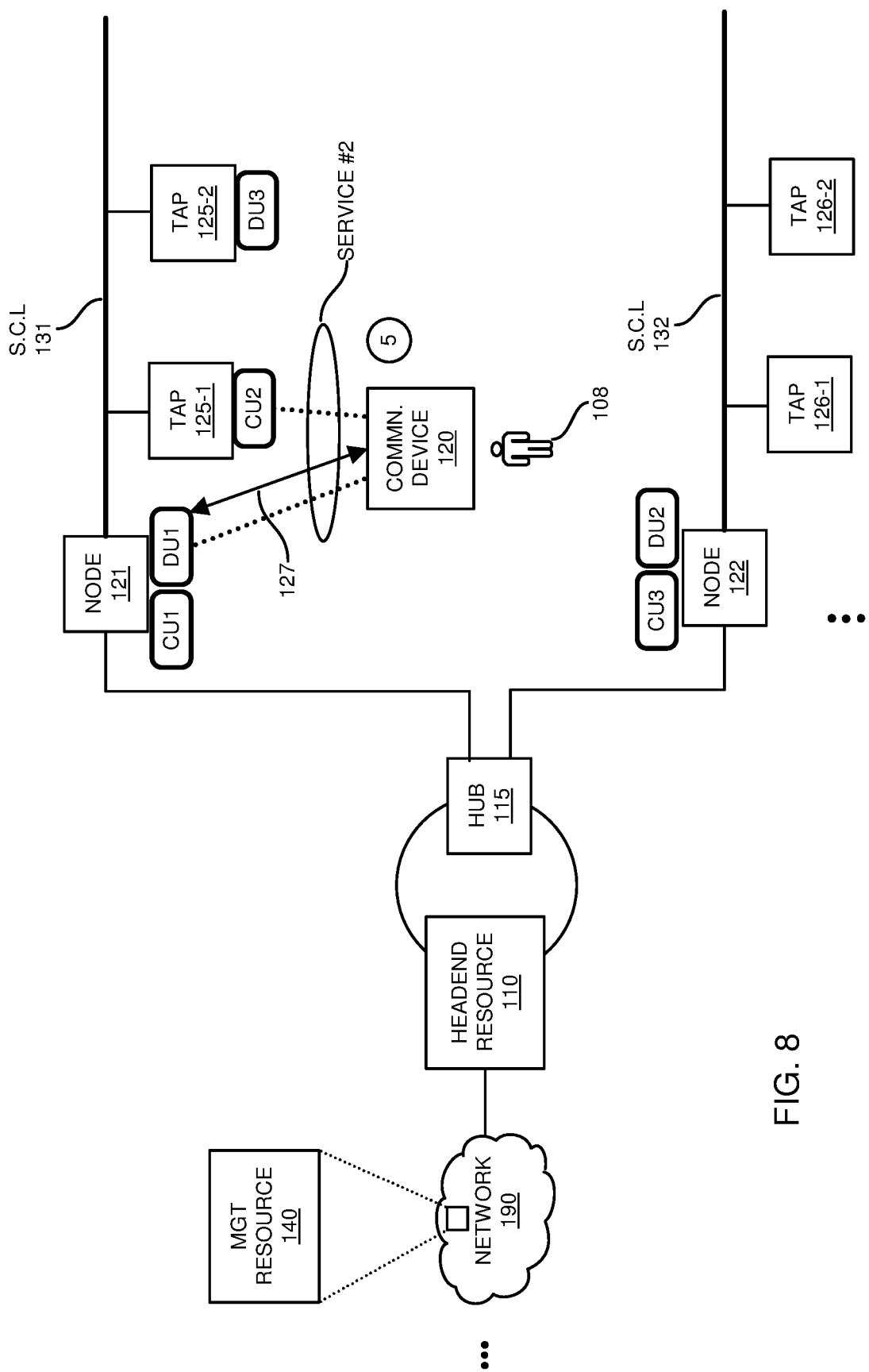
FIG. 8 is an example diagram illustrating results of transferring lower-layer processing from a first lower-layer processing unit to a second lower-layer processing unit to provide an upgraded wireless communication service to respective user equipment according to embodiments herein.

FIG. 8 is an example diagram illustrating results of transferring lower-layer communication processing from a first lower-layer processing unit to a second lower-layer processing unit to provide an upgraded wireless communication service to respective user equipment according to embodiments herein.

As shown in this example embodiment, the combination of upper-layer processing unit CU2 and lower-layer processing unit DU1 are sufficiently close in proximity to each other to provide requested service #2 to the communication device 120 and corresponding user 108.

Figure 9:
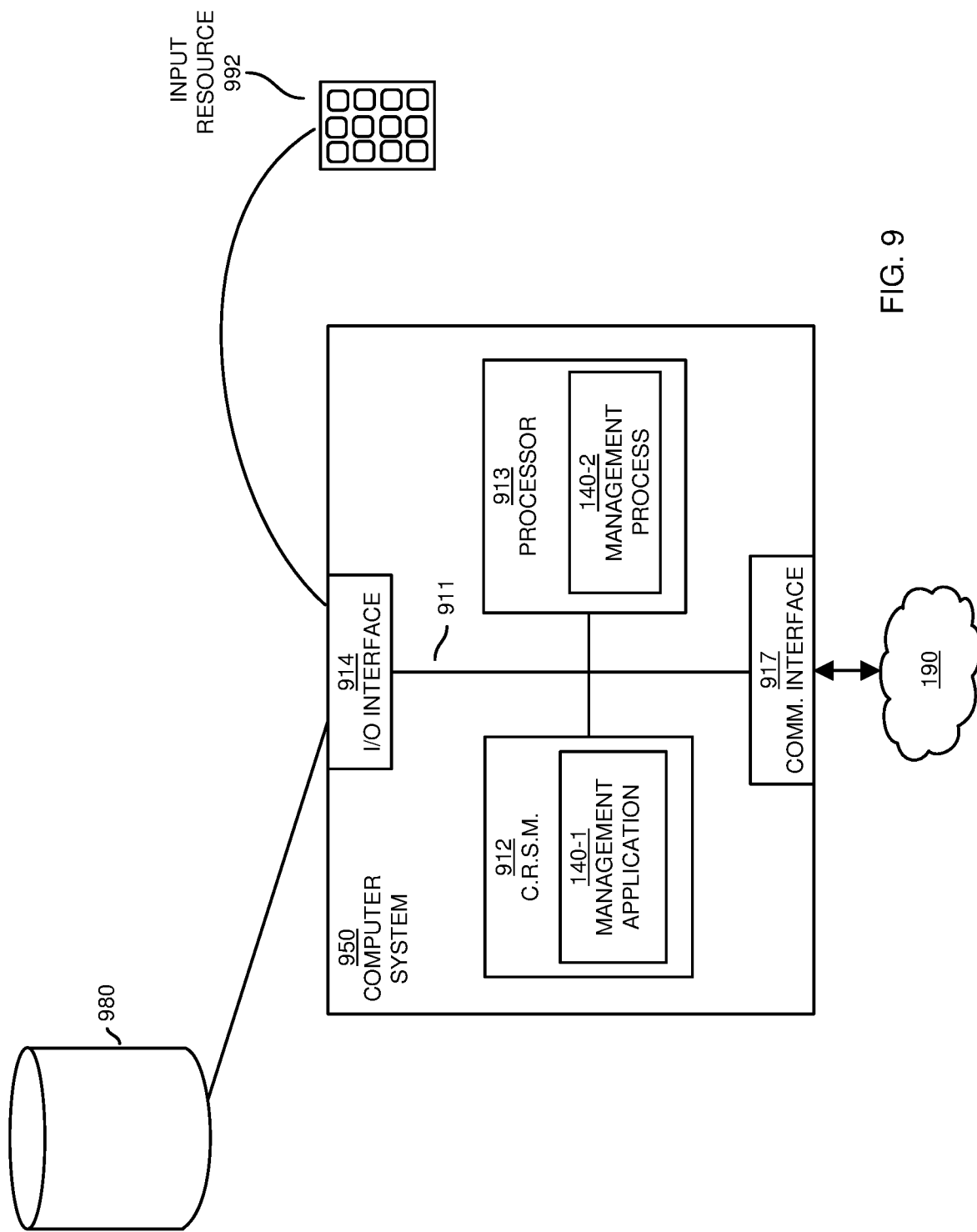
FIG. 9 is a diagram illustrating an example computer architecture to execute one or more operations according to embodiments herein.

FIG. 9 is an example block diagram of a computer system for implementing any of the operations as discussed herein according to embodiments herein.

Any of the resources (such as upper-layer processing units, lower-layer processing units, manager resource 140, etc.) as discussed herein can be configured to include computer processor hardware and corresponding executable instructions to carry out the different operations as discussed herein.

As shown, computer system 950 of the present example can include an interconnect 911 that couples computer readable storage media 912 such as a non-transitory type of media (i.e., any type of hardware storage medium) in which digital information can be stored and retrieved, a processor 913, I/O interface 914, and a communications interface 917.

I/O interface 914 supports connectivity to repository 980 and input resource 992.

Computer readable storage medium 912 can be any hardware storage device such as memory, optical storage, hard drive, floppy disk, etc. In one embodiment, the computer readable storage medium 912 stores instructions and/or data.

As shown, computer readable storage media 912 can be encoded with management application 140-1 (e.g., including instructions) to carry out any of the operations as discussed herein.

During operation of one embodiment, processor 913 accesses computer readable storage media 912 via the use of interconnect 911 in order to launch, run, execute, interpret or otherwise perform the instructions in management application 140-1 stored on computer readable storage medium 912. Execution of the management application 140-1 produces playback process 140-2 to carry out any of the operations and/or processes as discussed herein.

Those skilled in the art will understand that the computer system 950 can include other processes and/or software and hardware components, such as an operating system that controls allocation and use of hardware resources to playback application 140-1.

In accordance with different embodiments, note that computer system may be or included in any of various types of devices, including, but not limited to, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 950 may reside at any location or can be included in any suitable resource in any network environment to implement functionality as discussed herein.

Functionality supported by the different resources will now be discussed via flowcharts in FIG. 10. Note that the steps in the flowcharts below can be executed in any suitable order.

FIG. 10 is a flowchart 1000 illustrating an example method according to embodiments. Note that there will be some overlap with respect to concepts as discussed above.

In processing operation 1010, the system establishes a wireless communication link 127 between a wireless access point and a communication device 120 in a network, the wireless communication link 127 initially supported by a combination of a first upper-layer processing unit CU1 and a first lower-layer processing unit D3 in the network environment 100.

In processing operation 1020, the system notifies the first upper-layer processing unit of a service to be provided to the communication device 120 over the wireless communication link 127.

In processing operation 1030, the first upper-layer processing unit CU1 (or other suitable resource) selects a replacement upper-layer processing unit from a candidate pool of multiple available upper-layer processing units to support the service over the wireless communication link 127.

Note again that techniques herein are well suited to facilitate dynamic allocation of resources to support different wireless services to one or more communication devices in a network environment. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method of providing split protocol processing in a network, the method comprising:

establishing a wireless communication link between a wireless access point and a communication device in the network;

providing a first wireless service over the wireless communication link, the first wireless service supported by a first upper-layer protocol processing unit and a first lower-layer protocol processing unit in the network; and in response to receiving a request for a second wireless service, selecting a second upper-layer protocol processing unit as a replacement to the first upper-layer protocol processing unit;

the method further comprising:
at a management resource: i) receiving the request from the first lower-layer protocol processing unit, and ii) communicating a control notification to the first upper-layer protocol processing unit, the control notification causing the first upper-layer protocol processing unit to select the second upper-layer protocol processing unit as the replacement.

2. The method as in claim 1 further comprising:
selecting the second upper-layer protocol processing unit from a candidate pool of multiple available upper-layer protocol processing units; and
supporting the second wireless service over the wireless communication link via protocol processing provided by the second upper-layer protocol processing unit and the first lower-layer protocol processing unit.

3. The method as in claim 2 further comprising:
in response to detecting that a combination of the second upper-layer protocol processing unit and the first lower-layer protocol processing unit cannot support the second wireless service:
i) selecting a second lower-layer protocol processing unit from a candidate pool of multiple available lower-layer protocol processing units; and
ii) supporting the second wireless service over the wireless communication link via protocol processing provided by the second upper-layer protocol processing unit and the second lower-layer protocol processing unit.

4. The method as in claim 1 further comprising:
communicating state information associated with the wireless communication link from the first upper-layer protocol processing unit to the second upper-layer protocol processing unit.

5. The method as in claim 1 further comprising:
via the first upper-layer protocol processing unit, selecting the second upper-layer protocol processing unit from a pool of candidate upper-layer protocol processing units.

6. The method as in claim 1 further comprising:
receiving the request over the wireless communication link; and
processing the request via the first upper-layer protocol processing unit and the first lower-layer protocol processing unit in the network.

7. The method as in claim 1 further comprising:
via the first upper-layer protocol processing unit, selecting the second upper-layer protocol processing unit as the replacement to the first upper-layer protocol processing unit in response to receiving the request.

8. The method as in claim 1 further comprising:
from the first upper-layer protocol processing unit, providing notification to the second upper-layer processing unit that the second upper-layer processing unit has been selected to support protocol processing in lieu of the first upper-layer processing unit.

9. The method as in claim 1 further comprising:
selecting the second upper-layer protocol processing unit based on detecting that the second upper-layer protocol processing unit is physically closer to the first lower-layer protocol processing unit than the first upper-layer protocol processing unit.

10. The method as in claim 1 further comprising:
communicating service parameters from the management resource to the first upper-layer protocol processing unit, the service parameters indicating attributes of the second wireless service being provided to the communication device over the wireless communication link.

11. The method as in claim 1 further comprising:
communicating the control notification from the management resource to the first upper-layer protocol processing unit, the control notification notifying the first upper-layer protocol processing unit to select amongst a candidate pool of multiple available upper-layer protocol processing units to provide the second wireless service to the communication device.

12. The method as in claim 11, wherein the control notification includes service parameters indicating attributes of the second wireless service to be provided to the communication device.

13. The method as in claim 1 further comprising:
receiving the request over the wireless communication link from the communication device.

14. The method as in claim 13, wherein selecting the second upper-layer protocol processing unit includes:
receiving the request for the second wireless service from the first lower-layer protocol processing unit; and
notifying the first upper-layer protocol processing unit to select a substitute upper-layer protocol processing unit.

15. The method as in claim 14, wherein the first upper-layer protocol processing unit selects the second upper-layer protocol processing unit as the replacement to the first upper-layer protocol processing unit.

16. The method as in claim 1 further comprising:
producing a first mapping between the first upper-layer protocol processing unit and a first pool of multiple lower-layer protocol processing units, the first lower-layer protocol processing unit included in the first pool.

17. The method as in claim 16 further comprising:
producing a second mapping between the second upper-layer protocol processing unit and a second pool of multiple lower-layer protocol processing units, the first lower-layer protocol processing unit included in the second pool.

18. The method as in claim 1 further comprising:
providing the second wireless service over the wireless communication link, the second wireless service supported by the second upper-layer protocol processing unit and the first lower-layer protocol processing unit.

19. A system comprising:
a network of upper-layer protocol processing units and lower-layer protocol processing units operative to:
support a first wireless service over a wireless communication link between a wireless access point and a communication device, the first wireless service supported by a first upper-layer protocol processing unit and a first lower-layer protocol processing unit in the network;
in response to receiving a request for a second wireless service, select a second upper-layer protocol processing unit as a replacement to the first upper-layer protocol processing unit; and
at a management resource: i) receiving the request from the first lower-layer protocol processing unit, and ii) communicating a control notification to the first upper-layer protocol processing unit, the control notification causing the first upper-layer protocol processing unit to select the second upper-layer protocol processing unit as the replacement.

20. The system as in claim 19, wherein the first upper-layer protocol processing unit in the network is operative to:

select the second upper-layer protocol processing unit from a candidate pool of multiple available upper-layer protocol processing units; and support the second wireless service over the wireless communication link via processing provided by the second upper-layer protocol processing unit and the first lower-layer protocol processing unit.

21. The system as in claim 19, wherein the network is further operative to:

in response to detecting that a combination of the second upper-layer protocol processing unit and the first lower-layer protocol processing unit cannot support the second wireless service:

i) select a second lower-layer protocol processing unit from a candidate pool of multiple available lower-layer protocol processing units; and ii) support the second wireless service over the wireless communication link via protocol processing provided by the second upper-layer protocol processing unit and the second lower-layer protocol processing unit.

22. The system as in claim 19, wherein the network is further operative to:

communicate state information associated with the wireless communication link from the first upper-layer protocol processing unit to the second upper-layer protocol processing unit.

23. The system as in claim 19, wherein the network is further operative to:

via the first upper-layer protocol processing unit, select the second upper-layer protocol processing unit from a pool of candidate upper-layer protocol processing units.

24. The system as in claim 19, wherein the network is further operative to:

receive the request over the wireless communication link; and process the request via the first upper-layer protocol processing unit and the first lower-layer protocol processing unit in the network.

25. The system as in claim 19, wherein the network is further operative to:

via the first upper-layer protocol processing unit, select the second upper-layer protocol processing unit.

26. The system as in claim 19, wherein the network is further operative to:

from the first upper-layer protocol processing unit, provide notification to the second upper-layer processing unit that the second upper-layer processing unit has been selected to support processing of the upper-layers of the wireless communication link in lieu of the first upper-layer processing unit.

27. The system as in claim 19, wherein the network is further operative to:

select the second upper-layer protocol processing unit based on detecting that the second upper-layer protocol processing unit is physically closer to the first lower-layer protocol processing unit than the first upper-layer protocol processing unit.

28. The system as in claim 19, wherein the network is further operative to:

communicate service parameters from the management resource to the first upper-layer protocol processing unit, the service parameters indicating attributes of the second wireless service being provided to the communication device over the wireless communication link.

29. The system as in claim 19, wherein the network is further operative to:

communicate the control notification from the management resource to the first upper-layer protocol processing unit, the control notification notifying the first upper-layer protocol processing unit to select amongst a candidate pool of multiple available upper-layer protocol processing units to provide the second wireless service to the communication device.

30. The system as in claim 29, wherein the control notification includes service parameters indicating attributes of the second wireless service to be provided to the communication device.

31. Computer-readable storage hardware having instructions stored thereon, the instructions, when carried out by computer processor hardware, cause the computer processor hardware to:

establish a wireless communication link between a wireless access point and a communication device in the network;

provide a first wireless service over the wireless communication link, the first wireless service supported by a first upper-layer protocol processing unit and a first lower-layer protocol processing unit in the network;

in response to receiving a request for a second wireless service, select a second upper-layer protocol processing unit as a replacement to the first upper-layer protocol processing unit; and wherein the communication processor hardware, via execution of the instructions, is further operative to: i) receive the request from the first lower-layer protocol processing unit, and ii) communicate a control notification to the first upper-layer protocol processing unit, the control notification causing the first upper-layer protocol processing unit to select the second upper-layer protocol processing unit as the replacement.

32. A method of providing split protocol processing in a network, the method comprising:

establishing a wireless communication link between a wireless access point and a communication device in the network;

providing a first wireless service over the wireless communication link, the first wireless service supported by a first upper-layer protocol processing unit and a first lower-layer protocol processing unit in the network; and in response to receiving a request for a second wireless service, selecting a second upper-layer protocol processing unit as a replacement to the first upper-layer protocol processing unit;

the method further comprising:

producing a first mapping between the first upper-layer protocol processing unit and a first pool of multiple lower-layer protocol processing units, the first lower-layer protocol processing unit included in the first pool;

producing a second mapping between the second upper-layer protocol processing unit and a second pool of multiple lower-layer protocol processing units, the first lower-layer protocol processing unit included in the second pool; and wherein selecting the second upper-layer protocol processing unit as the replacement to the first upper-layer protocol processing unit includes: based on the second mapping indicating that the second upper-layer protocol processing unit is compatible with the first lower-layer protocol processing unit, transmitting a communication from the first upper-layer protocol processing unit to the second upper-layer protocol processing unit.

33. The method as in claim 32, wherein the communication causes the second upper-layer protocol processing unit and the first lower-layer protocol processing unit to provide the second wireless service to the communication device.

34. The method as in claim 33 further comprising:
handing off processing by the first lower-layer protocol processing unit to a second lower-layer protocol processing unit.

* * * * *